United States Patent [19]

Quock et al.

[11] 3,926,867
[45] Dec. 16, 1975

[54] HIGH RESILIENCY FLEXIBLE URETHANE FOAMS

[75] Inventors: Billy Quock, Richwood; Don Howard Kelley, Lake Jackson; Sehon Lester Warneke, Brazoria; Arthur E. Gurgiolo, Lake Jackson, all of Tex.

[73] Assignee: The Dow Chemical Company, Midland, Mich.

[22] Filed: Mar. 4, 1974

[21] Appl. No.: 448,164

Related U.S. Application Data

[63] Continuation-in-part of Ser. No. 410,135, Oct. 26, 1973, abandoned.

[52] U.S. Cl.................260/2.5 AM; 260/2.5 AP; 260/2.5 BE; 260/2.5 AC
[51] Int. Cl.² .................. C08G 18/14; C08G 18/32
[58] Field of Search...260/2.5 AM, 2.5 AQ, 77.5 AQ, 260/2.5 AC

[56] References Cited
UNITED STATES PATENTS

| | | | |
|---|---|---|---|
| 3,816,360 | 6/1974 | Taub | 260/2.5 AM |
| 3,821,132 | 6/1974 | Mao | 260/2.5 AM |

*Primary Examiner*—Donald E. Czaja
*Assistant Examiner*—C. Warren Ivy
*Attorney, Agent, or Firm*—James G. Carter

[57] ABSTRACT

Vicinal hydroxyl amines, such as secondary butanol amine, have been discovered to be effective substitutes for 4,4'-methylenebis(dichloroaniline) in the preparation of high resiliency polyurethane foams. These substitute crosslinkers are not suspected of being carcinogenic.

9 Claims, No Drawings

HIGH RESILIENCY FLEXIBLE URETHANE FOAMS

This application is a continuation-in-part of my application Ser. No. 410,135, filed Oct. 26, 1973, now abandoned.

This invention relates to polyurethane foams and more particularly it relates to high resiliency flexible polyurethane foams.

High resiliency flexible polyurethane foams have heretofore been prepared from polyether triols and polyisocyanates, but the use of crosslinkers such as 4,4'-methylenebis(2-chloroaniline) has been required. This compound has been suspected of being carcinogenic; therefore, the urethane industry has been searching for suitable substitutes for this compound.

It has now been unexpectedly discovered that certain crosslinkers described herein can be substituted for the 4,4'-methylenebis(2-chloroaniline) in the preparation of flexible, highly resilient urethane foams and these compounds are not at the present time suspected of being carcinogenic.

The present invention is therefore directed to flexible polyurethane foams having a resiliency of greater than about 50%, a modulus of at least about 2.3 resulting from subjecting to foaming conditions a composition which comprises A. a polyol composition consisting essentially of
 1. from about 50 to 100 and preferably from about 75 to 100 percent by weight of a primary hydroxyl-containing polyether triol having an average hydroxyl equivalent weight of from about 900 to about 2500,
 2. from 0 to about 50 and preferably from 0 to about 25 percent by weight of a diol, a triol, a polymer-containing diol, a polymer-containing triol or mixtures thereof wherein said polyols have an average hydroxyl equivalent weight of from about 900 to about 2500 and preferably from about 1000 to about 2000 and said polymer has an average molecular weight of at least about 5000 and preferably at least about 20000;
B. an organic polyisocyanate consisting of
 1. from about 50% to 100% and preferably from about 75% to 100% by weight of 2,4-toluene diisocyanate, 2,6-toluene diisocyanate, NCO-containing prepolymers thereof, or mixtures thereof, and
 2. from 0 to about 50% and preferably from about 0 to 25% by weight of an organic polyisocyanate having an average functionality of at least 2;
C. from about 1.0 to about 5 and preferably from about 2.0 to about 3.0 parts by weight of water per 100 parts by weight of component (A);
D. from 0 to about 20 and preferably from about 5 to about 10 parts of a low boiling auxiliary blowing agent per 100 parts by weight of component (A);
E. from about 0.6 to about 10 and preferably from about 1.5 to about 5 parts per 100 parts by weight of component (A) of a crosslinker composition consisting essentially of
 1. from 5 to 100 and preferably from 50 to 100 percent by weight of a primary crosslinker component consisting of a vicinal hydroxyl amine containing at least 4 carbon atoms, and
 2. from 0 to about 95 and preferably from 0 to about 50 percent by weight of an auxiliary crosslinker component;
F. from about 0.5 to about 4 and preferably from about 0.7 to about 1.5 parts by weight per 100 parts by weight of Compound (A) of a catalyst for the urethane reaction,
G. from about 0.005 to about 2.5 and preferably from about .02 to about 1.5 parts by weight per 100 parts by weight of Component (A) of a silicone oil cell control agent;

and wherein Components (A), (B), (C) and (E) are present in quantities so as to provide an NCO:active hydrogen equivalent ratio of from about .8:1.0 to about 1.3:1.0 and preferably from about 0.9:1.0 to about 1.1:1.0.

Suitable primary-hydroxyl containing triols which may be suitably employed as component (A1) include the reaction products of glycerine, trimethylolpropane, hexane triol, mixtures thereof or the like, with a 1,2-alkylene oxide having from 2 to about 4 carbon atoms or a mixture of such alkylene oxides and subsequently end-capping the resultant polyol with at least 1 mole of ethylene oxide per hydroxyl group and wherein the resultant end-capped triol has an average hydroxyl equivalent weight of from about 900 to about 2500 and preferably from about 1200 to about 2000. The primary-hydroxyl containing polyether polyol usually contains from about 4 to about 20% by weight of ethylene oxide on the end of the molecule.

The term polymer-containing diols and triols which may be employed as component (A-2) include those diols and triols having an average hydroxyl equivalent weight in the range of from about 900 to about 2500 and preferably from about 1000 to about 2000 and which contain from about 2 to about 50 and preferably from about 5 to about 20 parts by weight polymer having an average molecular weight of at least about 5000, and preferably at least about 20,000.

Such polymers may be physically blended with the diol or triol or they may be prepared insitu in the diol or triol wherein the diol or triol, or mixture thereof, are employed as the solvent or reaction medium for the polymerization and in some instances, the polymers are grafted onto the diol or triol.

Suitable such polymers and methods for their preparation are taught in U.S. Pat. Nos. 3,405,162; 3,652,639; 3,304,273; 3,383,351; and 3,523,093. So much of those applications as pertains to polymers and methods for their preparation are incorporated herein by reference.

The polymers may also be prepared by the aqueous emulsion techniques common to the "latex" art or as a dispersion in a non-isocyanate reactive medium. The polymers may be employed in the dry form, i.e. added to the triol or diol after removal of the water or non-isocyanate reactive medium therefrom or preferably the "latex" or dispersion itself may be added to the diol or triol and the water or non-isocyanate reactive medium subsequently removed therefrom by known procedures for removing water or other components from polyols such as evaporation under vacuum and the like.

The polymers employed herein may contain groups which are reactive with the NCO groups contained in the polyisocyanate, but it is not a requirement herein that said polymers contain such groups.

Particularly suitable polymers are those prepared by polymerizing one or more monomers containing ethylenic unsaturation such as, for example, styrene, acrylic acid, methacrylic acid, acrylonitrile, butadiene, crotonic acid, itaconic acid, dimethylaminomethymethacrylate, acrylamide, maleic acid, ethylacrylate, methylacrylate, butylacrylate, methylmethacrylate, ethylmethacrylate, butylmethacrylate, 2-ethylhexylacrylate, 2-ethylhexylmethacrylate, vinyl chloride, and monomethylmaleate.

Suitable diols and triols which may be employed as component (A-2) include those prepared by the reaction of a compound containing 2 or 3 active hydrogen groups such as, for example, water, ethylene glycol, propylene glycol, 1,4-butane diol, 1,6-hexane diol, glycerin, trimethylol propane, mixtures thereof and the like with a 1,2-epoxy compound such as ethylene oxide, 1,2-propylene oxide, 1,2-butylene oxide, 2,3-butylene oxide, styrene oxide, mixtures thereof and the like and which have an average hydroxyl equivalent weight of from about 900 to about 2500 and preferably from about 1000 to about 2000. Also suitable are the polyester diols having an average hydroxyl equivalent weight of from about 900 to about 2500 and preferably from about 1000 to about 2000.

Suitable organic polyisocyanates which may be employed in admixture with the toluene diisocyanate or NCO-containing prepolymers thereof include any such isocyanate which does not contain a substituent group which is capable of reacting with the polyether triol. Suitable such isocyanates include
polymethylene polyphenylisocyanate,
1,5-naphthalenediisocyanate,
cumene-2,4-diisocyanate,
4-methoxy-1,3-phenylenediisocyanate,
4-chloro-1,3-phenylenediisocyanate,
4-bromo-1,3-phenylenediisocyanate,
4-ethoxy-1,3-phenylenediisocyanate,
isophoronediisocyanate,
2,4'-diisocyanatodiphenylether,
5,6-dimethyl-1,3-phenylenediisocyanate,
2,4-dimethyl-1,3-phenylenediisocyanate,
4,4'-diisocyanatodiphenylether,
benzidinediisocyanate,
4,6-dimethyl-1,3-phenylenediisocyanate,
4,4'-diisocyanatodibenzyl,
9,10-anthracenediisocyanate,
3,3'-dimethyl-4,4'-diisocyanatodiphenylmethane,
2,6'-dimethyl-4,4'-diisocyanatodiphenyl,
2,4-diisocyanatostilbene,
3,3'-dimethyl-4,4'-diisocyanatodiphenyl,
3,3'-dimethoxy-4,4'-diisocyanatodiphenyl,
1,4-anthracenediisocyanate,
2,5-fluorenediisocyanate,
1,8-naththalenediisocyanate,
2,6-diisocyanatobenzfuran,
2,4,6-toluenetriisocyanate, and
2,4,4'-triisocyanatatodiphenylether;
crude or undistilled isocyanates,
dimers or trimers of toluene diisocyanates.

Other organic polyisocyanates that can be used are the polyisocyanates described in Canadian Pat. No. 700,026 and in U.S. Pat. No. 2,683,730; the phenyl indane diisocyanates which are described in U.S. Pat. No. 2,855,385, the organic diisocyanates and the organic triisocyanates which are described in U.S. Pat. No. 2,292,443; and the organic triisocyanates which are described in U.S. Pat. No. 2,929,794.

Suitable NCO-containing prepolymers of 2,4- and 2,6-toluenediisocyanate which can be employed as the polyisocyanate component (B1) includes those prepared by reacting an excess of the toluenediisocyanate with a substance having from 2 to about 4 active hydrogen atoms and an active hydrogen equivalent weight of from about 30 to about 2500, preferably from about 30 to about 300.

Suitable such active hydrogen-containing substances include for example, ethylene diamine, ammonia, methyl amine, aminoethylethanol amine, propylene diamine, ethylene glycol, propylene glycol, butylene glycol, hexane diol, pentanediol, bisphenols, halogen substituted bisphenols, neopentyl glycol, halogenated neopentyl glycol, adducts of such active hydrogen-containing substances with vic-epoxy-containing compounds such as for example, ethylene oxide, propylene oxide, 1,2-butylene oxide, 2,3-butylene oxide, styrene oxide, epichlorohydrin, epibromohydrin, phenyl glycidyl ether, butyl glycidyl ether, dibromophenyl glycidyl ether, mixtures thereof and the like.

It is preferred that the NCO-containing prepolymer contain from about 10% to about 45% free NCO groups by weight.

It should be understood that in the preparation of prepolymers from an excess of the toluene diisocyanate, that the resultant product will usually contain some unreacted toluene diisocyanate.

Suitable vicinal hydroxyl amine compounds containing at least 4 carbon atoms which can be employed herein include, for example, those represented by the general formulas:

I. 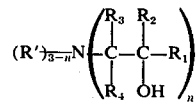

wherein $R_1$, $R_2$, $R_3$ and $R_4$ are independently hydrogen, an alkyl group having from 1 to about 10 carbon atoms, or a $—C—O—R_5$ group wherein $R_5$ is an aliphatic hydrocarbon group having from 1 to about 10 carbon atoms, a phenyl group, a one to four carbon alkyl substituted phenyl group, or a mono or dihalo substituted phenyl group, $R'$ is hydrogen, an aliphatic hydrocarbon group having from 1 to about 10 carbon atoms, a hydroxy alkyl group having from 1 to about 10 carbon atoms or a phenyl group and wherein $n$ has a value of 1 to 3 inclusive, with the proviso that the sum of the carbon atoms contained in the $R_1$, $R_2$, $R_3$ and $R_4$ groups is at least 2.

II. 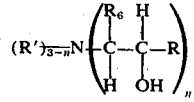

wherein $R$ and $R_6$ collectively represent a divalent 3 to 6 carbon atom saturated or unsaturated hydrocarbon group thereby forming a 5 to 8 membered ring and wherein $R'$ and $n$ are as defined in formula I above.

III. 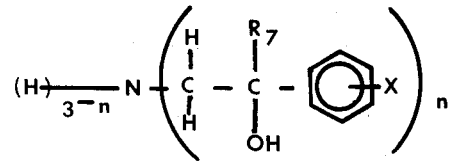

IV. 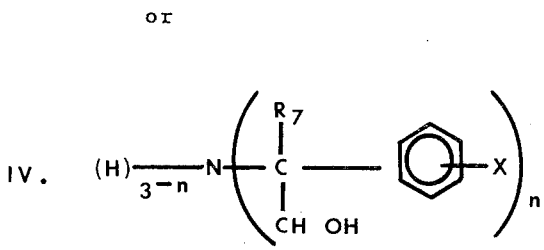

wherein each $R_7$ is independently hydrogen or an alkyl group having from 1–4 carbon atoms, each X is independently hydrogen, chlorine, bromine or an alkyl group having from 1–4 carbon atoms and $n$ has a value of from 1 to 3 inclusive.

Suitable vicinal hydroxyl amine compounds include, for example, 1-amino-2-hydroxybutane; 2-amino-1-hydroxybutane; 2-amino-1-hydroxy-2-methylpropane; bis(2-hydroxybutyl)amine; tris(2-hydroxybutyl)amine; 3-phenoxy-2-hydroxypropylamine; 2-phenyl-2-hydroxyethylamine; 1-amino-2-hydroxycyclopentane; 2-hydroxypropyl-N-phenylamine; 2-hydroxyethyl-N-phenylamine; 3-phenoxy-2-hydroxypropyl-N-phenylamine; 2-hydroxybutyl-N-phenylamine; bis(3-phenoxy-2-hydroxypropyl)amine; 2-hydroxyethyl-N-(3-phenoxy-2-hydroxy propyl amine; 1-amino-2-hydroxycyclopentane; 1-amino-2-hydroxycyclooctane; 2-hydroxyethyl-N-(2-hydroxybutyl)amine.

The vicinal hydroxyl amine compounds are readily prepared by reacting ammonia, a primary or secondary amine or a primary or secondary hydroxyl amine with a vicinal epoxy-containing compound employing known procedures.

When the crosslinker, component (E), consisting of at least about 50% by weight of the vicinal hydroxyl amine compound containing at least 4 carbon atoms, is employed, one or more of the physical properties such as tensile strength, tear strength, and/or elongation are improved as compared to foams prepared by employing mono-, di- and tri-ethanol amines or mono-, di- or tri-isopropanol amines as the crosslinker component.

Suitable auxiliary crosslinker compounds include, for example, tris(polyoxyalkylene alkanol) amines; mono-, di- and tri-isopropanol amines; oxyhydrocarbon or oxyhydrocarboxy derivatives of isocyanuric acid or aryl substituted isocyanuric acid, oxydianiline; mono-, di-, and triethanol amines; or an aliphatic diol or a polyether diol, said diols having an OH equivalent weight of less than about 300 and preferably less than about 200, or mixtures thereof.

Suitable tris(polyoxyalkylene alkanol) amines which may be employed herein include those represented by the formula

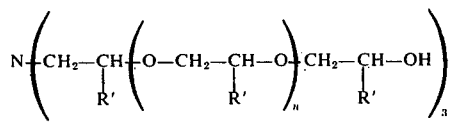

wherein each $R'$ is independently hydrogen, methyl or ethyl, and each n has an average value of from zero to about 5. The substances represented by the above formula are readily prepared by the condensation of ammonia with an alkylene oxide such as ethylene oxide, 1,2-propylene oxide, 1,2-butylene oxide, 1,2-isobutylene oxide or mixtures thereof. The products of the condensation reaction are most generally a mixture of products, wherein the components mixture can be, if desired, separated by distillation or other suitable means or the mixture itself be employed as an auxiliary crosslinker.

Suitable oxyhydrocarbon or oxyhydrocarboxy derivatives of isocyanuric acid or aryl substituted isocyanuric acid which may be employed herein are those represented by the general formula

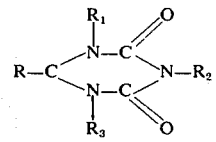

wherein R is = O or a member of the group represented by the formula

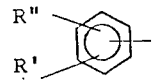

wherein each $R'$ and $R''$ are independently hydrogen, Cl, Br, OH or an alkyl group having from 1 to about 6 carbon atoms, each $R_1$, $R_2$ and $R_3$ is independently selected from the formulas

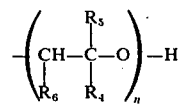

wherein each $R_4$ is independently hydrogen, phenyl, methyl, ethyl or halomethyl, each $R_5$ and $R_6$ are independently hydrogen or methyl with the proviso that only one of such groups can be a methyl group, each n is independently 0, 1, 2 or 3; and

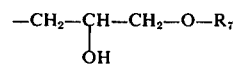

wherein $R_7$ is selected from the group consisting of allyl, methallyl, an aryl group, a haloaryl group, a dihalo-aryl group or an alkaryl group; with the proviso that no more than 2 of the $R_1$, $R_2$ and $R_3$ groups can be represented by the formula

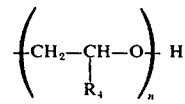

when R₄ is hydrogen, methyl or halomethyl.

The above crosslinker compounds may be prepared by reacting the isocyanuric acid or an isocyanuric acid derivative with a 1,2-epoxide-containing compound in a molar ratio of cyanuric acid to epoxide-containing compound of from about 1:2.5 to about 1:3.5 and preferably from about 1:2.9 to about 1:3.1 in the presence of a suitable basic catalyst and a lower polar or non-polar solvent or reaction medium at temperatures of from about 80° to about 120° and preferably from about 100° to about 120°C until the reaction is essentially complete and subsequent removal of the solvent by conventional means.

In addition to isocyanuric acid, suitable isocyanuric acid derivatives which may be employed include, for example, 2-hydroxyphenyl isocyanuric acid, phenyl isocyanuric acid, methyl isocyanuric acid, ethyl isocyanuric acid, butyl isocyanuric acid, propyl isocyanuric acid, mixtures thereof and the like.

suitable 1,2-epoxy-containing compounds which may be employed include, for example, ethylene oxide, 1,2-propylene oxide, 1,2-butylene oxide, 2,3-butylene oxide, 1,2-isobutylene oxide, epichlorohydrin, phenyl glycidyl ether, butyl glycidyl ether, styrene oxide, mixtures thereof and the like.

Suitable basic catalysts which may be employed include sodium hydroxide, potassium hydroxide, benzyl trimethyl ammonium chloride, tetramethyl ammonium chloride, tetramethyl ammonium bromide, dodecyl dimethyl (2-phenoxyethyl) ammonium bromide and the like.

Suitable solvents or reaction mediums which may be employed include, for example, carbon tetrachloride, trichloromethane, dichloromethane, 1,2-dichloroethane, 1,1,2,2-tetrachloroethane, 1,1,2,2-tetrachloroethane, 1,1,1-trichloroethane, mixtures thereof and the like.

The isocyanuric acid from which many of the crosslinkers employed herein are prepared is a well known article of commerce.

The aromatic and substituted aromatic isocyanuric acid derivatives from which many of the crosslinkers are prepared may be prepared by the reaction of urea or biuret with benzaldehyde, substituted benzaldehyde, benzal chloride or substituted benzal chloride as taught in s-TRIAZINES AND DERIVATIVES, Interscience Publishers, Inc., 1959, page 211-212.

Suitable such compounds represented by the above formula which may be employed as a crosslinker herein include, for example, N-3-phenoxy-2-hydroxypropyl-N'-N" bis(2-hydroxypropyl)isocyanurate, N-2-hydroxypropyl-N'-N" bis(3-phenoxy-2-hydroxypropyl)isocyanurate, N-3-phenoxy-2-hydroxypropyl-N'-N"-bis(2-hydroxybutyl)isocyanurate, N-3-p-methylphenoxy-2-hydroxypropyl-N',N" bis(2-hydroxypropyl)isocyanurate, N-2-phenyl-2-hydroxyethyl-N'-N"-bis(2-hydroxypropyl)isocyanurate, N,N',N"-tris(2-hydroxypropyl)-p-hydroxyphenylisocyanurate, N,N',N"-tris(2-hydroxypropyl)-phenylisocyanurate, mixtures thereof and the like.

Suitable aliphatic diols which may be employed as a crosslinker herein include, for example, ethylene glycol, diethylene glycol, propylene glycol, dipropylene glycol, 1,2-butane diol, 1,3-butane diol, 1,4-butane diol, mixtures thereof and the like.

Suitable polyether diols which may be employed as a crosslinker herein include, for example, polyoxyethylene glycols, polyoxypropylene glycols, polyoxybutylene glycols, mixtures thereof and the like.

Suitable auxiliary blowing agents include aliphatic hydrocarbons boiling below 110°C. or halogenated aliphatic hydrocarbons boiling below 110°C. such as dichlorodifluoromethane, trichlorofluoromethane, hexane, hexene, or pentane as the blowing or foaming agent. Suitable foaming agents are disclosed in U.S. Pat. No. 3,072,582.

Suitable tertiary amine catalysts include, for example, triethylenediamine, N-ethylmorpholine, N(dimethylaminoethyl)piperazine, N,N'-bis(dimethylaminoethyl) piperazine, tetramethyl butanediamine, dimethylethanolamine, bis(2-dimethylaminomethyl)ether, mixtures thereof and the like.

Organometal catalysts such as stannous octoate, dibutyltindilaurate and the like may also be employed either alone or together with the tertiary amine catalyst if desired.

Inorganic and organic fillers such as, for example, calcium carbonate, barytes, sand, expandable polystyrene beads, and the like may be included in the foams of the present invention.

Fire retardant agents such as, for example, tris(2,3-dibromopropyl)phosphate; tris(2-chloroethyl) phosphate; tris(dichloropropyl)phosphate; triethylphosphate, mixtures thereof, and the like may also be employed in the foams of the present invention.

Suitable silicone oils include polymers of dimethyl siloxane having a viscosity at 77°F. of 5 centistokes or other silicone oils which are commercially available.

The following examples are illustrative of the present invention, but are not to be construed as to limiting the scope thereof in any manner.

In each of the following examples, components (A), (C), (E), (F), and (G) were blended together until the components were equally dispersed. Then the isocyanate, component (B), was quickly added and after stirring for several seconds, the mixture was foamed in a vented closed mold at the indicated temperature.

The compositions and the physical properties of the foams are given in Table I. Unless otherwise indicated, the quantities of the components are in parts by weight.

TABLE

| | EXAMPLE 1 | COMPARATIVE EXPERIMENT A | EXAMPLE 2 | COMPARATIVE EXPERIMENT B | EXAMPLE 3 | EXAMPLE 4 |
|---|---|---|---|---|---|---|
| Component A, Type/parts (Polyol) | A/100 | A/100 | A/100 | A/100 | A/100 | A/100 |
| Component B, Type/parts (Isocyanate) | A/31.2 | A/31.0 | B/36.6 | B/33.9 | B/35.3 | B/36.9 |
| Component C, parts (Water) | 2.5 | 2.5 | 2.4 | 2.4 | 2.4 | 2.4 |
| Component E, Type/parts (crosslinker) | A/0.05 B/0.6 | B/0.6 | A/1 C/2 | C/2.5 | D/3 | D/4 |
| Component F, Type/parts (catalyst) | A/0.6 B/0.1 | A/0.6 B/0.1 | A/0.6 B/0.1 C/0.01 | A/0.6 B/0.1 C/0.01 | D/0.2 B/0.1 C/0.01 | D/0.2 B/0.1 C/0.01 |
| Component G, Type/parts | | | | | | |

TABLE-continued

|  | EXAMPLE 1 | COMPARATIVE EXPERIMENT A | EXAMPLE 2 | COMPARATIVE EXPERIMENT B | EXAMPLE 3 | EXAMPLE 4 |
| --- | --- | --- | --- | --- | --- | --- |
| (cell control agent) | A/0.03 | A/0.03 | A/0.03 | A/0.03 | A/0.03 | A/0.03 |
| Mold Temp. (°F) | 123 | 122 | 120 | 120 | 120 | 120 |
| Density, lbs/ft$^3$ | 2.77 | 2.67 | 2.67 | 2.68 | 2.64 | 2.77 |
| Tensile, psi | 13.5 | 11.6 | 24.3 | 22.8 | 15 | 17.8 |
| Elongation, % | 144 | 124 | 250 | 228 | 170 | 182 |
| Tear Strength,[4] lbs/in. | 1.4 | 1.15 | 2.62 | 2.48 | 1.48 | 1.6 |
| Resiliency[3], % | 65 | 66 | 56 | 56 | 58 | 50 |
| Compression set at 75% deflection, % | 7.9 | 5.9 | 17.9 | 14.8 | 10 | 12.4 |
| ILD$^3$, 25% | 27 | 27.5 | 37 | 37 | 38 | 40.5 |
| 65% | 73 | 71.5 | 100 | 99 | 107 | 111 |
| Modulus$^2$ | 2.7 | 2.6 | 2.7 | 2.67 | 2.82 | 2.74 |

|  | EXAMPLE 5 | EXAMPLE 6 | EXAMPLE 7 | EXAMPLE 8 | EXAMPLE 9 |
| --- | --- | --- | --- | --- | --- |
| Component A, Type/parts (Polyol) | A/100 | A/100 | A/100 | A/100 | A/100 |
| Component B, Type/parts (Isocyanate) | A/37.9 | B/40.4 | B/36.6 | B/37.9 | B/37.9 |
| Component C, parts (Water) | 2.4 | 2.4 | 2.4 | 2.4 | 2.4 |
| Component E, Type/parts (crosslinker) | D/5 | D/7 | E/2.0 | F/2 | G/2 |
| Component F, Type/parts (catalyst) | D/0.2 | D/0.2 | A/0.6 | A/0.6 | A/0.6 |
|  | B/0.1 | B/0.1 | B/0.1 | B/0.1 | B/0.1 |
|  | C/0.01 | C/0.01 | C/0.005 | C/0.01 | C/0.01 |
| Component G, Type/parts (cell control agent) | A/0.03 | A/0.03 | A/0.03 | A/0.03 | A/0.03 |
| Mold Temp. (°F) | 120 | 120 | 120 | 120–125 | 120–125 |
| Density, lbs/ft$^3$ | 2.77 | 2.76 | 2.7 | 2.4 | 2.55 |
| Tensile, psi | 15.3 | 15.1 | 21.8 | 20.7 | 23.1 |
| Elongation, % | 143 | 136 | 203 | 223 | 262 |
| Tear Strength,[4] lbs/in. | 1.4 | 1.52 | 1.95 | 2.4 | 2.3 |
| Resiliency[3], % | 52 | 51 | 55 | 53 | 53 |
| Compression set at 75% deflection, % | 10.8 | 13.2 | 14.9 | 75 | 60 |
| ILD$^3$, 25% | 46.5 | 50 | 36 | 30.5 | 28.5 |
| 65% | 118 | 122 | 97 | 82 | 80 |
| Modulus$^2$ | 2.54 | 2.44 | 2.69 | 2.68 | 2.8 |

[1]Resiliency was determined by ASTM D-1564-71.
[2]Modulus is the 65% ILD:25% ILD.
[3]ILD is Indentation Load Deflection at 25% and 65% by ASTM D-1564-71.
[4]Tear Strength was determined by ASTM D-1564-71.

POLYOL A was the reaction product of glycerine with propylene oxide and end-capped with ethylene oxide. The polyol had an OH equivalent weight of about 1650 and contained from about 13 to about 15 percent by weight of ethylene oxide end-capping.

POLYISOCYANATE A was an 80/20 mixture of 2,4-/2,6-toluene-diisocyanate having an NCO equivalent weight of about 87.

POLYISOCYANATE B was a crude toluene diisocyanate comprising about 66.61% 2,4-isomer and 26.1% 2,6-isomer and the remainder higher polyisocyanates, the crude product having an NCO equivalent weight of about 91.2.

CROSSLINKER A was mono-secondary butanol amine (1-amino-2-hydroxy butane).

CROSSLINKER B was diethanol amine.

CROSSLINKER C was oxydianiline.

CROSSLINKER D was tris(secondary butanol amine).

CROSSLINKER E was a mixture of 56% by weight mono-2-hydroxybutanol amine, 39% di-2-hydroxybutanol amine, and 5% tri-2-hydroxybutanol amine.

CROSSLINKER F was 2-amino-1-hydroxybutane.

CROSSLINKER G was 2-amino-1-hydroxy-2-methyl propane.

CATALYST A was a 33% solution of triethylene diamine in dipropylene glycol.

CATALYST B was bis(2-dimethylaminoethyl)ether.

CATALYST C was a tin catalyst for use in the preparation of polyurethane foams commercially available from Argus Chemical Corp. as Markure UL-1.

CATALYST D was solid triethylene diamine dissolved in the water employed as the blowing agent.

CELL CONTROL AGENT A was a dimethyl siloxane polymer having a viscosity at 77°F of 5.0 centistokes.

We claim:

1. A flexible polyurethane foam having a resiliency greater than about 50%, a modulus of at least about 2.3 and a density of less than about 5 lbs/ft$^3$ resulting from subjecting to foaming conditions, a composition which comprises A. 1. from about 50 to 100 percent by weight of a polyether triol having an average hydroxyl equivalent weight of from about 900 to about 2500, said triol having been end-capped with at least 1 mole of ethylene oxide per hydroxyl group to provide the triol with primary hydroxyl groups, 2. from 0 to about 50 percent by weight of a polyol selected from a diol, a triol, or mixtures thereof wherein said diols and and triols have an average hydroxyl equivalent weight of from about 900 to about 2500;

B. an organic polyisocyanate consisting of 1. from about 50% to 100% by weight of 2,4-toluene diisocyanate, 2,6-toluene diisocyanate, NCO-containing prepolymers thereof, or mixtures thereof, and 2. from 0 to about 50% by weight of an organic polyisocyanate having an average NCO functionality of at least 2;

C. from about 1.0 to about 5 parts by weight of water per 100 parts by weight of component (A);

D. from about 0 to about 20 parts of a low boiling auxiliary blowing agent per 100 parts by weight of component (A);

E. from about 0.6 to about 10 parts per 100 parts by weight of component (A) of a crosslinker composition consisting essentially of 1. from 5 to 100 percent by weight of a primary crosslinker component selected from the group consisting of 1-amino-2-hydroxybutane; 2-amino-1-hydroxybutane; 2-amino-1-hydroxy-2-methylpropane; bis(2-hydroxybutyl)amine; tris(2-hydroxybutyl)amine; 3-phenoxy-2-hydroxypropyl amine; 2-phenyl-2-hydroxyethylamine; 3-phenoxy-2-hydroxypropyl-N-phenylamine; 2-hydroxybutyl-N-phenylamine; bis(3-phenoxy-2-hydroxypropyl)amine; 2-hydroxyethyl-N-(3-phenoxy-2-hydroxypropyl)amine; 1-amino-2-hydroxycyclopentane; 1-amino-2-hydroxycyclooctane; 2-hydroxyethyl-N-(2-hydroxybutyl)amine, and mixtures thereof; and
2. from 0 to about 95 percent by weight of an auxiliary crosslinker component;

F. from about 0.5 to about 4 parts by weight per 100 parts by weight of Component (A) of a catalyst for the urethane reaction;

G. from about 0.005 to about 2.5 parts by weight per 100 parts by weight of Component (A) of a silicone oil cell control agent;

and wherein Components (A), (B), (C) and (E) are present in quantities so as to provide an NCO:active hydrogen ratio of from about 0.8:1.0 to about 1.3:1.0.

2. The flexible polyurethane foam of claim 1 wherein Components (A),(B),(C) and (E) are employed in quantities so as to provide an NCO:active hydrogen ratio of from about 0.9:1 to about 1.1:1, Component (E) is present in quantities of from about 2 to about 5 parts by weight per 100 parts by weight of Component (A), Component (G) is present in quantities of from about 0.02 to about 1.5 parts by weight per 100 parts by weight of Component (A), and wherein Component (A) comprises from 75–100 parts of (1) and 0–25 parts by weight of (2).

3. The flexible polyurethane foam of claim 2 wherein Component (E-1) is present in quantities of from about 50 to about 100 percent and Component (E-2) is present in from about 0 to about 50 percent.

4. The flexible polyurethane foam of claim 3 wherein Component (E-1) is selected from the group consisting of 1-amino-2-hydroxybutane, bis(2-hydroxybutyl)amine, tris(2-hydroxybutyl)amine, 2-amino-1-hydroxybutane, 2-amino-1-hydroxy-2-methylpropane and mixtures thereof.

5. The flexible polyurethane foam of claim 4 wherein Component (E-1) is tris(2-hydroxybutyl)amine.

6. The flexible polyurethane foam of claim 4 wherein Component (E) consists of 100 percent of Component (E-1).

7. The flexible polyurethane foam of claim 6 wherein Component (A-1) is a glycerine initiated polyether polyol.

8. The flexible polyurethane foam of claim 7 wherein Component (A) consists of 100% of Component (A-1).

9. The polyurethane foam of claim 1 wherein Component (A) (2) is selected from polymer-containing diols and polymer-containing triols wherein said diols and triols have an average hydroxyl equivalent weight of from about 900 to about 2500 and wherein said polymer has an average molecular weight of at least about 5000.

* * * * *